United States Patent
Chen

(10) Patent No.: US 8,508,937 B2
(45) Date of Patent: Aug. 13, 2013

(54) STYLUS RECEIVING MECHANISM AND PORTABLE COMPUTER THEREWITH

(75) Inventor: Chih-Hao Chen, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 310 days.

(21) Appl. No.: 13/154,442

(22) Filed: Jun. 7, 2011

(65) Prior Publication Data
US 2011/0299241 A1 Dec. 8, 2011

(30) Foreign Application Priority Data
Jun. 7, 2010 (TW) .............................. 99210810 U

(51) Int. Cl.
*G06F 1/16* (2006.01)
(52) U.S. Cl.
USPC ............ 361/679.59; 361/679.55; 361/679.56; 345/179
(58) Field of Classification Search
USPC .................................... 361/679.59; 16/111.1
See application file for complete search history.

(56) References Cited

U.S. PATENT DOCUMENTS

| | | | | | |
|---|---|---|---|---|---|
| 2,708,989 | A | * | 5/1955 | Bogdanski | 16/111.1 |
| 3,252,489 | A | * | 5/1966 | Huston et al. | 30/308.1 |
| 5,612,720 | A | * | 3/1997 | Ito et al. | 345/179 |
| 5,703,626 | A | * | 12/1997 | Itoh et al. | 345/173 |
| 5,881,615 | A | * | 3/1999 | Dahl et al. | 81/490 |
| 5,996,956 | A | * | 12/1999 | Shawver | 248/309.1 |
| 6,017,106 | A | * | 1/2000 | Adams et al. | 312/223.2 |
| 6,177,926 | B1 | * | 1/2001 | Kunert | 345/173 |
| 6,701,995 | B1 | * | 3/2004 | Bogdanski | 160/127 |
| 7,106,309 | B2 | * | 9/2006 | Wood et al. | 345/173 |
| 7,158,376 | B2 | * | 1/2007 | Richardson et al. | 361/679.56 |
| 7,821,782 | B2 | * | 10/2010 | Doherty et al. | 361/679.26 |
| 8,194,055 | B2 | * | 6/2012 | Liu et al. | 345/179 |
| 2007/0076362 | A1 | * | 4/2007 | Lagnado | 361/683 |

* cited by examiner

*Primary Examiner* — Anthony Q Edwards
(74) *Attorney, Agent, or Firm* — Winston Hsu; Scott Margo

(57) ABSTRACT

A stylus receiving mechanism includes a handle whereon a first opening and a second opening are formed on two ends. A chamber is formed inside the handle for receiving a stylus. The stylus receiving mechanism further includes a fastening part installed on an inner wall of the handle and disposed on a side of the chamber for pressing the stylus in a third direction perpendicular to a first direction for fastening the stylus inside the chamber after the stylus passes through the first opening in the first direction or passes through the second opening in the second direction opposite to the first direction to be received inside the chamber.

20 Claims, 8 Drawing Sheets

STYLUS RECEIVING MECHANISM AND PORTABLE COMPUTER THEREWITH

BACKGROUND OF THE INVENTION

1. Field of the Invention

The present invention relates to a stylus receiving mechanism and a portable computer therewith, and more specifically, to a stylus receiving mechanism capable of bi-directionally receiving a stylus and a portable computer therewith.

2. Description of the Prior Art

In modern information society, portable electronic devices are widely used in every field. A large quantity of data is communicated, processed, and stored in digital data format, thus computers used for reading and accessing data have become very important tools. Especially portable computers such as notebooks, personal digital assistants (PDAs) and global positioning systems (GPS), which by their small size, lightness, and portability, help users to search, browse, and store various kinds of data at anytime at any place. Therefore, portable computers have become one of the most important digital data platforms and the focus of much development. Concerning portable computers, both compactness and usability of the human input interface are emphasized; therefore a touch panel is used as part of the man machine interface (MMI). When a user uses a stylus to touch or press on the touch panel, the touch panel can sense the position or even the strength of the stress and control the computer according to the associated command.

Conventionally, a slot is formed on a lateral side of the portable electronic device, and the stylus is disposed inside the slot. However, since the stylus is fixed to one side of the portable electronic device, it is inconvenient for the user, who is accustomed to this side, to take the stylus from another side. For example, if the stylus is fixed to the right side of the portable electronic device, a left-handed person has to take the stylus by his/her unaccustomed right hand. Furthermore, the design of a stylus fixing mechanism disposed on the portable electronic device enlarges its size and increases its manufacture cost. If the portable electronic device is designed for waterproof function, it might reduce waterproof effect due to leakage of the stylus fixing mechanism. Thus, design of a stylus receiving mechanism capable of receiving a stylus effectively and conveniently is an important issue nowadays.

SUMMARY OF THE INVENTION

The present invention provides a stylus receiving mechanism capable of receiving a stylus bi-directionally and a portable computer therewith to solve the problems mentioned above.

According to the claimed invention, a stylus receiving mechanism includes a handle, whereon a first opening and a second opening are formed on two ends, a chamber being formed inside the handle for receiving a stylus; and at least one fastening part installed on an inner wall of the handle and disposed on a side of the chamber for pressing the stylus in a third direction perpendicular to a first direction for fastening the stylus inside the chamber after the stylus passes through the first opening in the first direction or passes through the second opening in a second direction opposite to the first direction to be received inside the chamber.

According to the claimed invention, the stylus receiving mechanism further includes at least one blocking part formed on the inner wall of the handle and disposed on an another side of the chamber, two blocking structures being formed on two ends of the blocking part respectively for blocking the stylus in the first direction or in the second direction when the stylus passes through the first opening in the first direction or passes through the second opening in the second direction to be received inside the chamber.

According to the claimed invention, the blocking structure is an inclined structure.

According to the claimed invention, two grooves are formed on the inner wall of the handle and disposed on two sides of the chamber respectively for accommodating a keyswitch of the stylus when the stylus is received inside the chamber.

According to the claimed invention, at least one groove is formed on the inner wall of the handle for accommodating a keyswitch of the stylus when the stylus is received inside the chamber.

According to the claimed invention, the fastening part and the handle are connected with double injection molding technology.

According to the claimed invention, the fastening part is made of elastic material.

According to the claimed invention, the stylus receiving mechanism further includes a holding structure connected to an outer side of the handle.

According to the claimed invention, two inclined structures are formed on the two ends of the handle respectively, and the first opening and the second opening are formed on the two inclined structures correspondingly.

According to the claimed invention, a portable computer includes a host; a stylus for use with the host; and a stylus receiving mechanism connected to the host for receiving the stylus. The stylus receiving mechanism includes a handle connected to the host, whereon a first opening and a second opening are formed on two ends, a chamber being formed inside the handle for receiving the stylus; and at least one fastening part installed on an inner wall of the handle and disposed on a side of the chamber for pressing the stylus in a third direction perpendicular to a first direction for fastening the stylus inside the chamber after the stylus passes through the first opening in the first direction or passes through the second opening in a second direction opposite to the first direction to be received inside the chamber.

According to the claimed invention, the portable computer further includes a connecting part connected to an end of the stylus and the host.

According to the claimed invention, the connecting part is a string.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
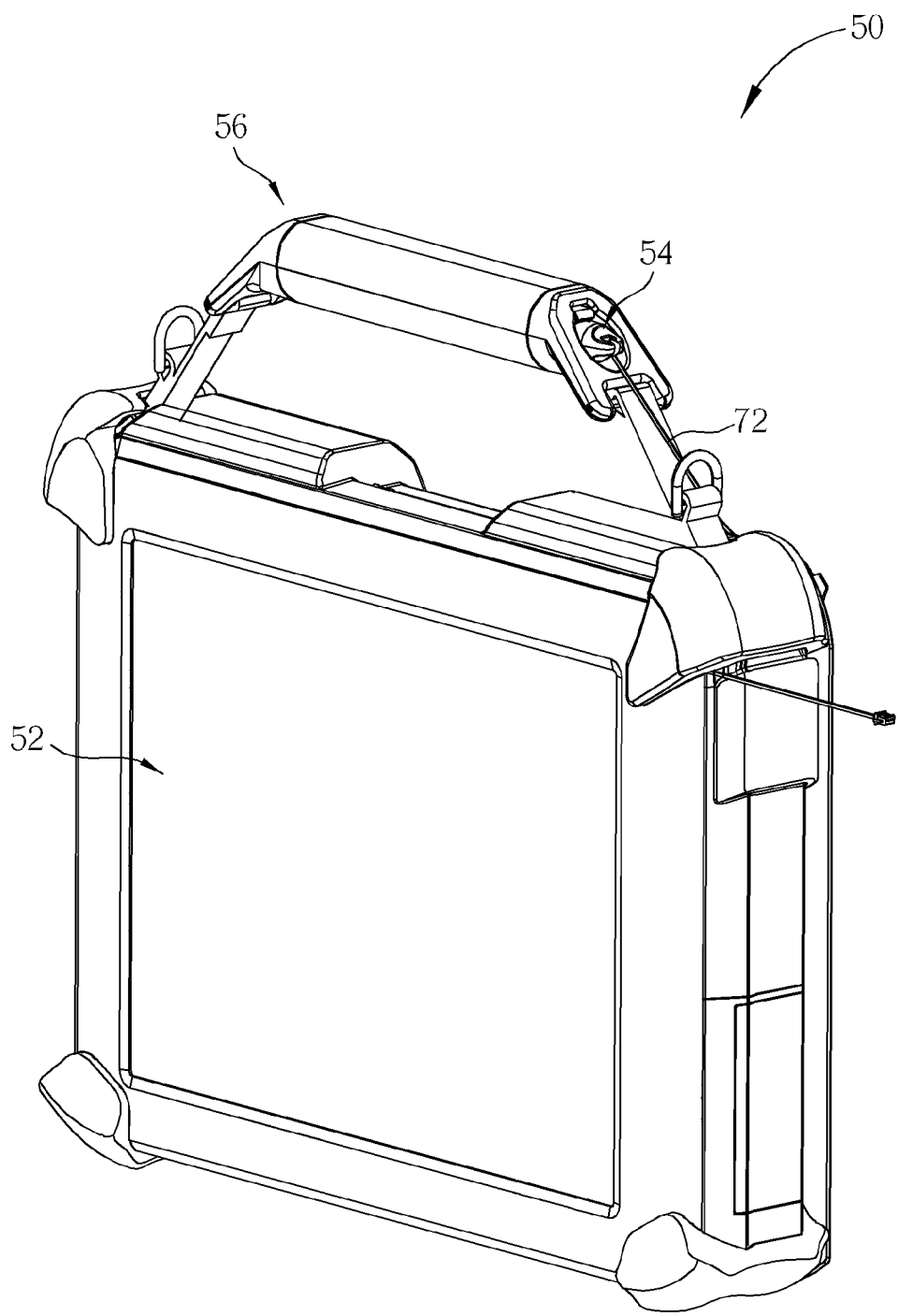
FIG. 1 and FIG. 2 are schematic diagrams of a portable computer at different view angles according to a preferred embodiment of the present invention.
Figure 2:
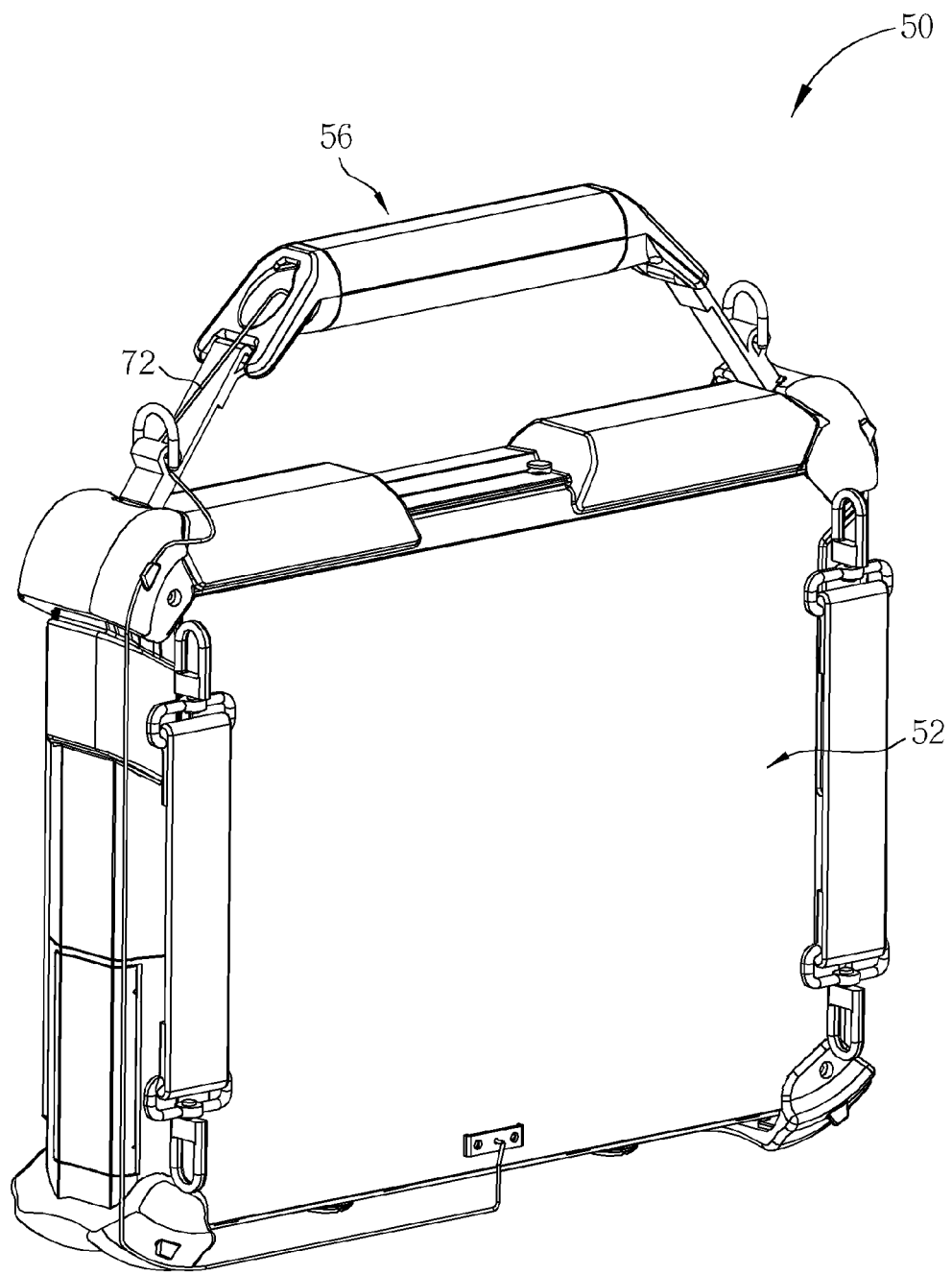
Figure 3:
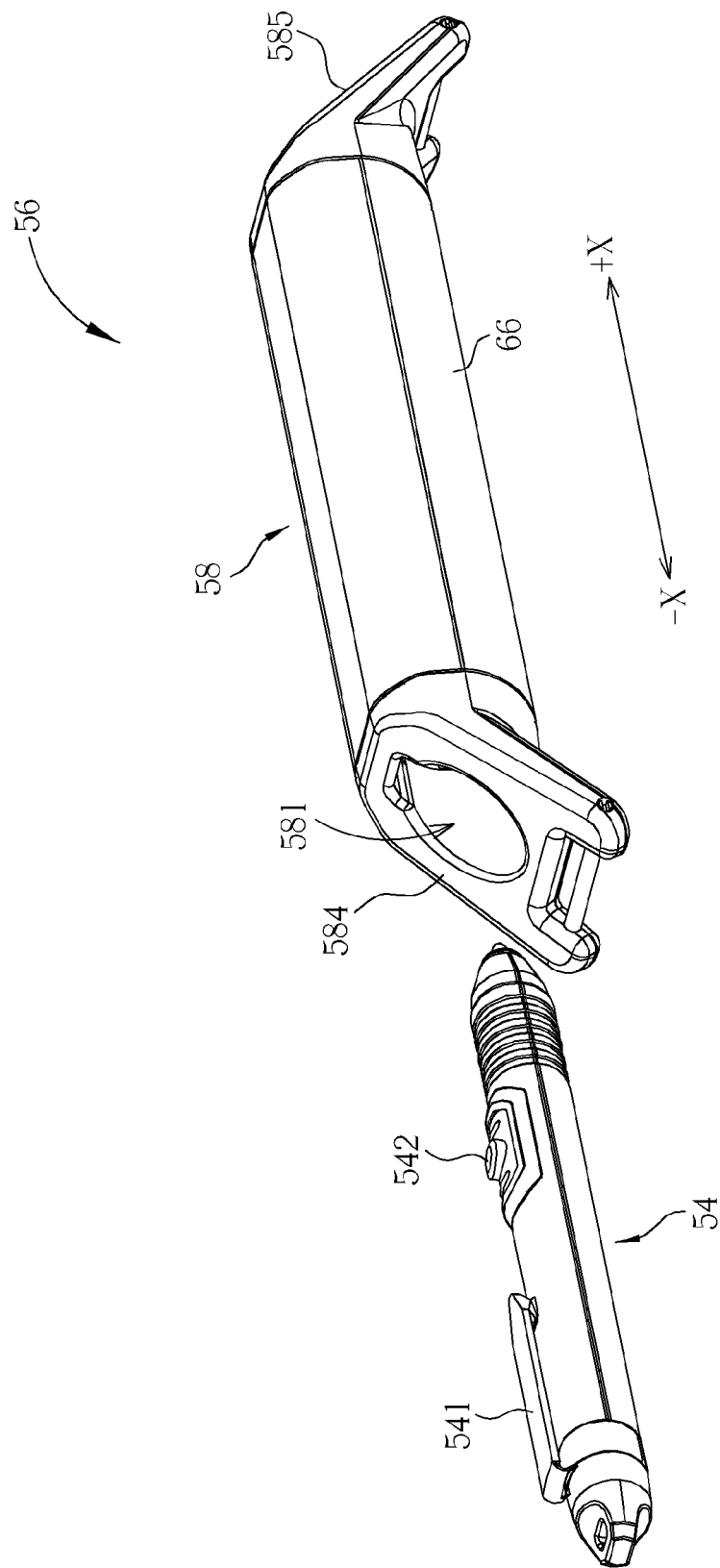
FIG. 3 and FIG. 4 are schematic diagrams of the stylus receiving mechanism receiving the stylus in the different directions according to the preferred embodiment of the present invention.
Figure 4:
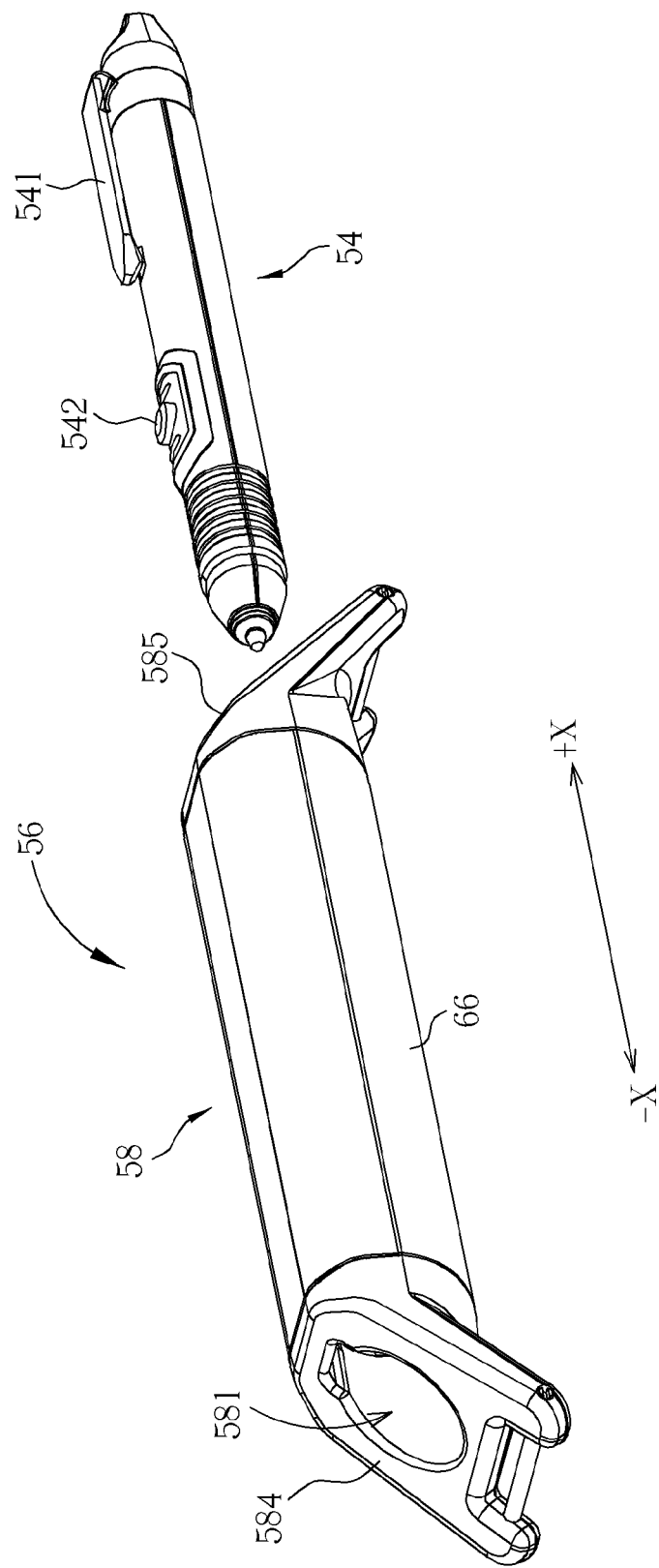
Figure 5:
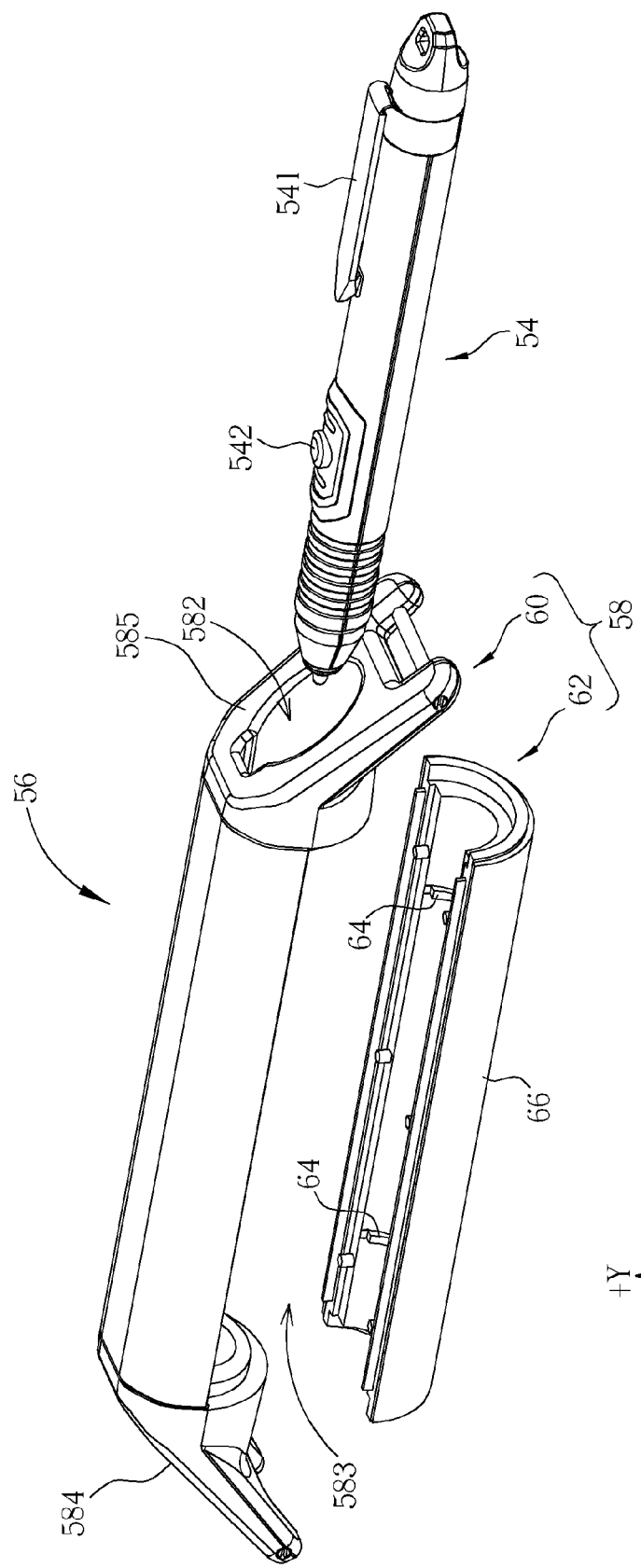
FIG. 5 is an exploded diagram of parts of the stylus receiving mechanism according to the preferred embodiment of the present invention.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the figure (s) being described. Please refer to FIG. 1 and FIG. 2. FIG. 1 and FIG. 2 are schematic diagrams of a portable computer 50 at different view angles according to a preferred embodiment of the present invention. The portable computer 50 can be a tablet computer, a notebook computer and so on. The portable computer 50 includes a host 52, a stylus 54 for use with the host 52, and a stylus receiving mechanism 56 connected to the host 52 for receiving the stylus 54. Please refer to FIG. 1 to FIG. 5, FIG. 3 and FIG. 4 are schematic diagrams of the stylus receiving mechanism 56 receiving the stylus 54 indifferent directions according to the preferred embodiment of the present invention, and FIG. 5 is an exploded diagram of parts of the stylus receiving mechanism 56 according to the preferred embodiment of the present invention. The stylus receiving mechanism 56 includes a handle 58 connected to the host 52 shown in FIG. 1 and FIG. 2 for a user to lift and carry the host 52 with the handle 58. A first opening 581 and a second opening 582 are formed on two ends of the handle 58, and a chamber 583 is formed inside the handle 58 for receiving the stylus 54. The stylus 54 can pass through the first opening 581 in a first direction (+X direction) or passes through the second opening 582 in a second direction (−X direction) opposite to the first direction to be received inside the chamber 583 of the handle 58. That is to say, the handle 58 can receive the stylus 54 bi-directionally, so it provides convenient operation for both right-handed users and left-handed users. Besides, two inclined structures 584, 585 are formed on the two ends of the handle 58 respectively, and the first opening 581 and the second opening 582 are formed on the two inclined structures 584, 585 correspondingly for the user to take the stylus 54 conveniently.

Figure 6:
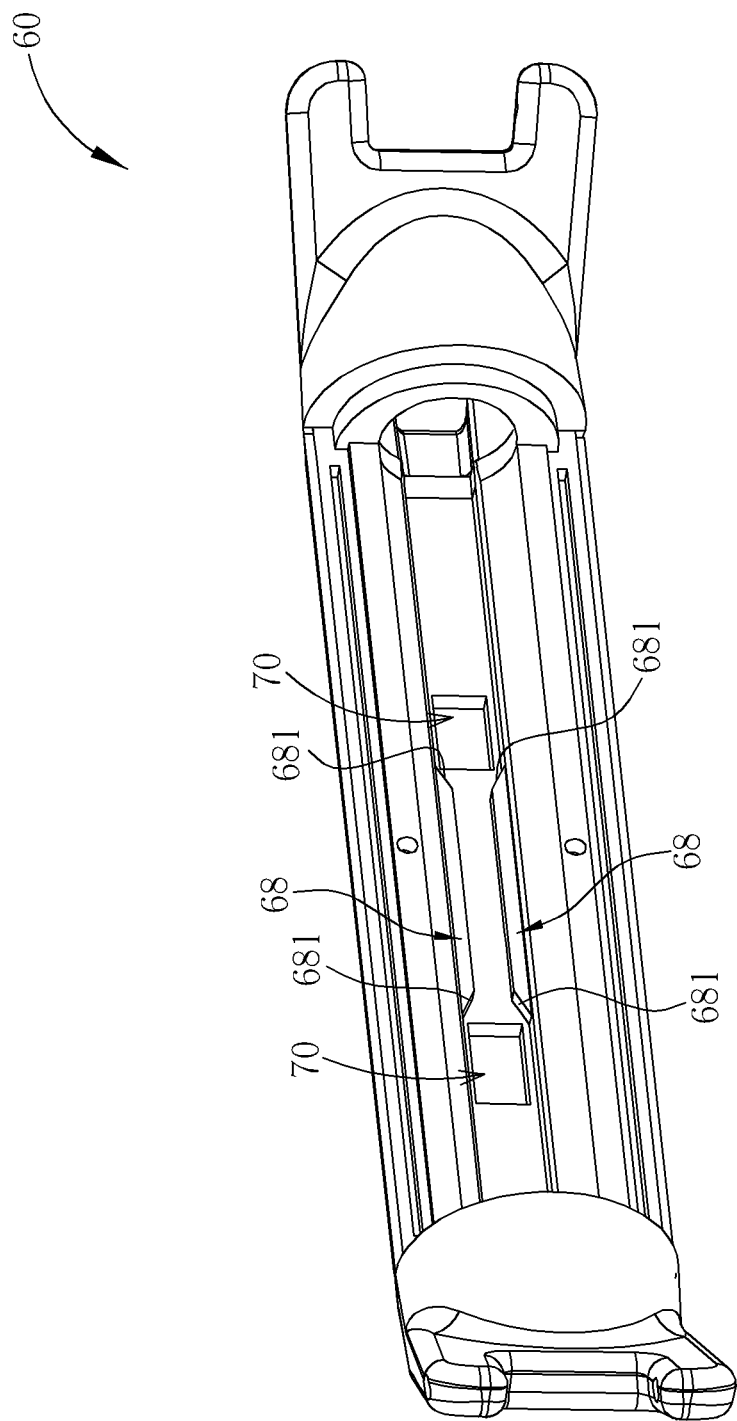
FIG. 6 and FIG. 7 are schematic diagrams of the upper casing and the lower casing according to the preferred embodiment of the present invention.
Figure 7:
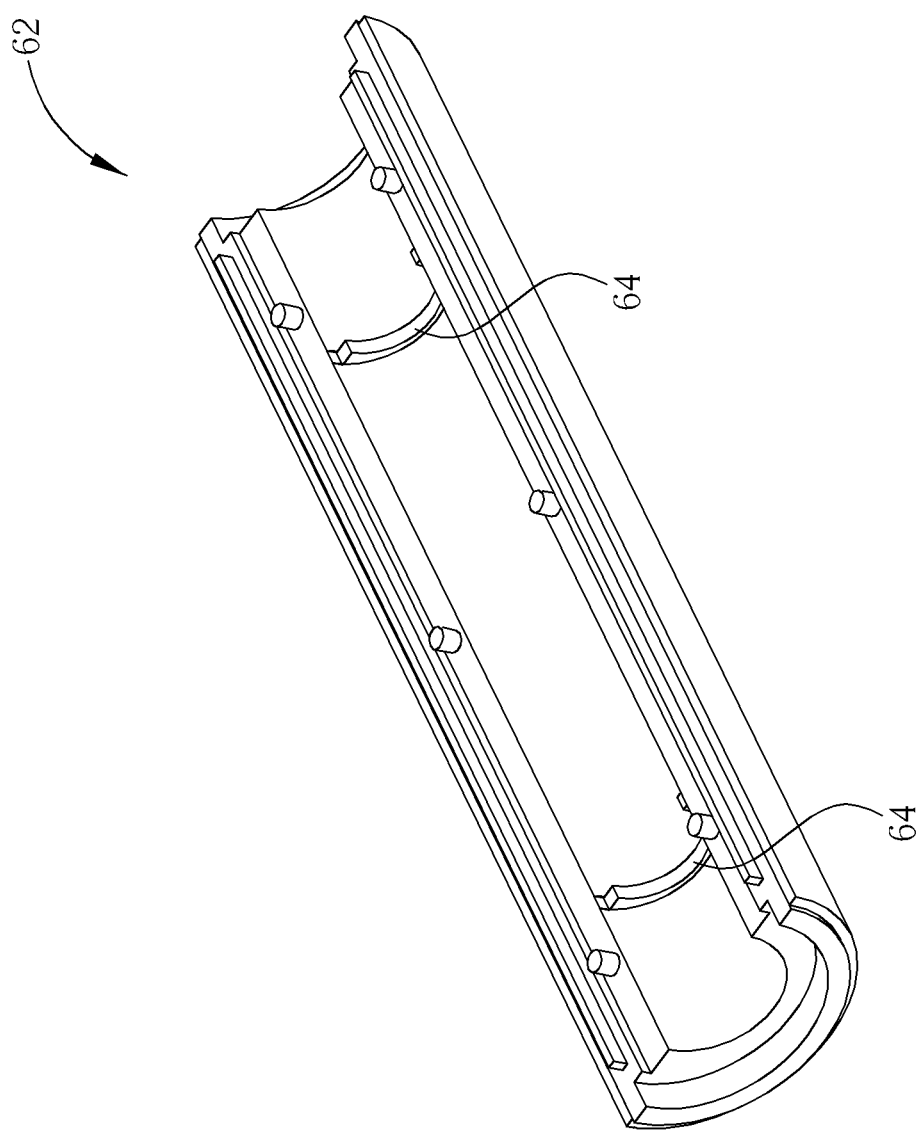

Besides, the handle 58 can be integrated monolithically or include a plurality of structural parts connected to each other. In this embodiment, the handle 58 includes an upper casing 60, and a lower casing 62 connected to the upper casing 60. Please refer to FIG. 6 and FIG. 7, FIG. 6 and FIG. 7 are schematic diagrams of the upper casing 60 and the lower casing 62 according to the preferred embodiment of the present invention. The stylus receiving mechanism 56 further includes at least one fastening part 64. In this embodiment, the stylus receiving mechanism 56 includes two fastening parts 64. The location and the number of the fastening parts 64 are not limited to the present embodiment, and depend on actual design demand. The fastening part 64 is installed on an inner wall of the lower casing 62 of the handle 58 and disposed on a side of the chamber 583. The fastening part 64 and the handle 58 can be connected with double injection molding technology. The handle 58 can be made of plastic material, and the fastening part 64 can be made of elastic material, such as rubber material, and so on. The fastening part 64 presses the stylus 54 in a third direction (+Y direction) substantially perpendicular to the first direction (+X direction) for fastening the stylus 54 inside the chamber 583 of the handle 58 after the stylus 54 passes through the first opening 581 in the first direction (+X direction) or passes through the second opening 582 in the second direction (−X direction) to fasten the stylus 54 inside the chamber 583. Besides, the stylus receiving mechanism 56 further includes a holding structure 66 connected to an outer side of the handle 58 to provide the user with better handling feel, for example, with soft material or non-slip handling feel. The holding structure 66 and the handle 58 can be connected with double injection molding technology. For example, the holding structure 66 can be formed with the fastening part 64 in one injection molding. The holding structure 66 can be made of soft material, such as rubber material and so on.

Furthermore, the stylus receiving mechanism 56 further includes at least one blocking part 68 formed on the inner wall of the upper casing 60 of the handle 58 and disposed on another side of the chamber 583. In this embodiment, the stylus receiving mechanism 56 includes two blocking parts 68. The location and the number of the blocking parts 68 are not limited to this embodiment, and depend on actual design demand. Two blocking structures 681 are formed on two ends of the blocking part 68 respectively. Each blocking structure 681 can be an inclined structure, and the inclined directions of the two inclined structures can be opposite to each other. Therefore, the two blocking parts 68 block a clip 541 of the stylus 54 in the second direction (−X direction) or in the first direction (+X direction) to respectively prevent the stylus 54 from falling out of the second opening 582 or out of the first opening 581 when the stylus 54 passes through the first opening 581 in the first direction (+X direction) or passes through the second opening 582 in the second direction (−X direction) to be received inside the chamber 583 of the handle 58. Besides, two grooves 70 are formed on the inner wall of the upper casing 60 of the handle 58 and disposed on two sides of the blocking part 68 respectively for accommodating a keyswitch 542 of the stylus 54 when the stylus 54 passes through the first opening 581 in the first direction (+X direction) or passes through the second opening 582 in the second direction (−X direction) to be received inside the chamber 583.

Figure 8:
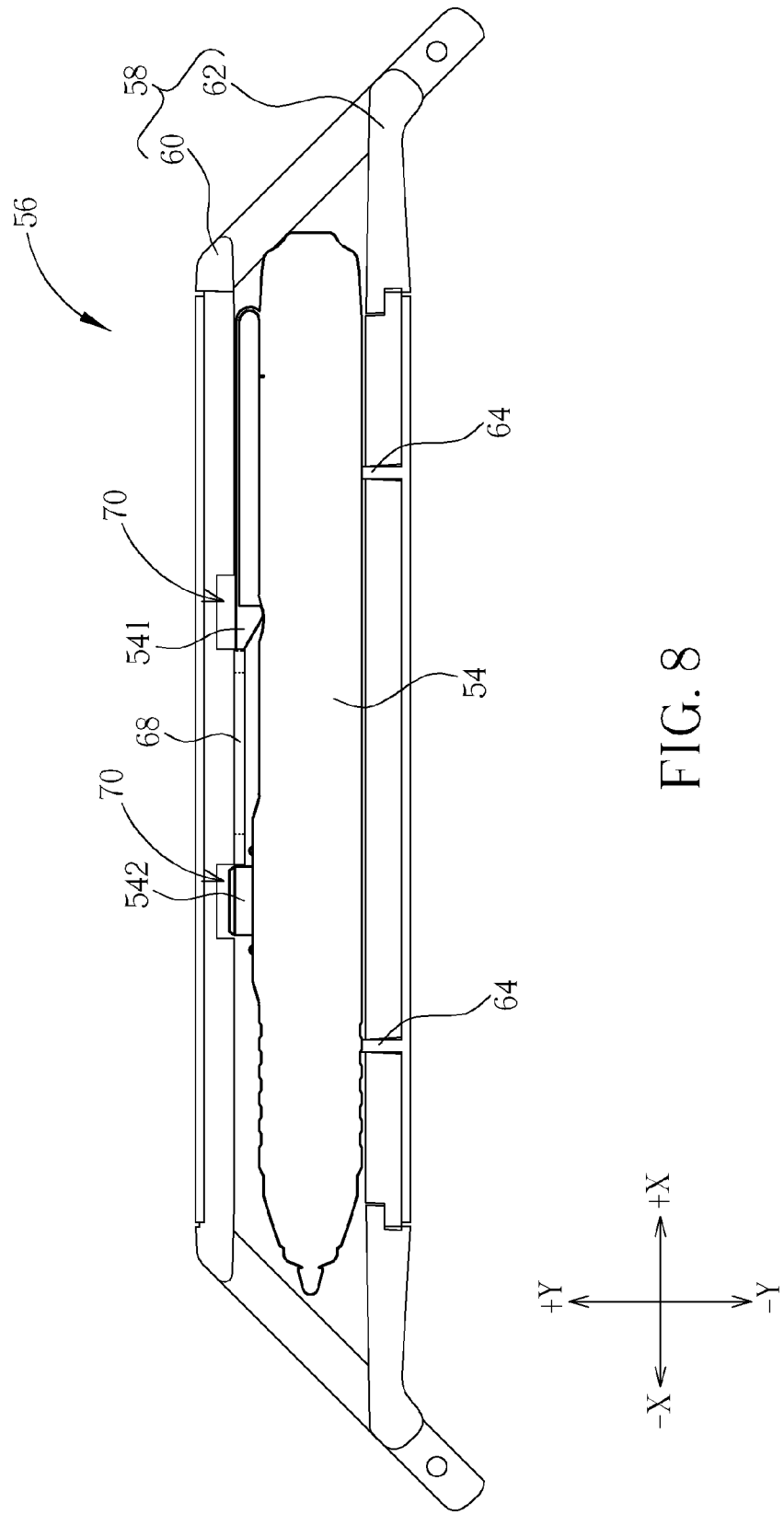
FIG. 8 is a cross-sectional diagram of the stylus receiving mechanism receiving the stylus according to the preferred embodiment of the present invention.

Please refer to FIG. 8, and FIG. 8 is a cross-sectional diagram of the stylus receiving mechanism 56 receiving the stylus 54 according to the preferred embodiment of the present invention. As shown in FIG. 3 and FIG. 4, the fastening part 64 presses the stylus 54 in the third direction (+Y direction) for fastening the stylus 54 inside the chamber 583 after the stylus 54 passes through the first opening 581 in the first direction (+X direction) or passes through the second opening 582 in the second direction (−X direction) to receive the stylus 54 inside the chamber 58. Furthermore, the blocking part 68 blocks the clip 541 of the stylus 54 in the second direction (−X direction) or in the first direction (+X direction) to prevent the stylus 54 from falling out of the second opening 582 or out of the first opening 581. Besides, the keyswitch 542 of the stylus 54 can be accommodated in the groove 70 of the inner wall of the handle 58, so as to receive and fix the stylus 54 inside the chamber 583 of the handle 58 firmly by the aforesaid fixing structures. In the aforesaid embodiment, the fastening parts 64, the blocking structures 681 of the blocking parts 68, and the grooves 70, of the receiving mechanism 56, can be in a pair configuration of structural design. The fastening parts 64, the blocking structures 68 of the blocking parts 64, and the grooves 70, of the receiving mechanism 56, even can represent a symmetrical structural design, so as to achieve the bidirectional stylus receiving mechanism when the stylus 54 passes through the first opening 581 in the first direction (+X direction) or passes through the second opening 582 in the second direction (−X direction). Such that the handle 58 can receive the stylus 54 in a bidirectional way, it provides the convenience of operation for both right-handed users and left-handed users.

Moreover, please refer to FIG. 1 and FIG. 2, in order to prevent the missing of the stylus 54, the portable computer 50 can further include a connecting part 72 connected to an end of the stylus 54 and a side of the host 52. In this embodiment, the connecting part 72 is connected to a back side of the host 52, but the connecting location is not limited to the embodiment as shown in FIG. 1 and FIG. 2. It can prevent the stylus 54 departing from the host 52 by utilizing the connecting part 72 connecting the stylus 54 and the host 52, so as to prevent the missing of the stylus 54. The connecting part 72 can be a string winding around a casing of the host 52.

In contrast to the prior art, the stylus receiving mechanism of the present invention can bi-directionally receive stylus, so as to provide both right-handed users and left-handed users with the convenience of operation. Furthermore, the stylus receiving mechanism of the present invention accommodates the stylus in the handle outside the host, so the stylus receiving mechanism of the present invention does not occupy extra space in the host, such that the size of the host and manufacture cost do not increase, and it can prevent leakage due to disposal of the receiving mechanism on the host. Therefore, the present invention provides the stylus receiving mechanism capable of receiving the stylus effectively and conveniently.

Those skilled in the art will readily observe that numerous modifications and alterations of the device and method may be made while retaining the teachings of the invention.

What is claimed is:

1. A stylus receiving mechanism comprising:
a handle, whereon a first opening and a second opening are formed on two ends, a chamber being formed inside the handle for receiving a stylus; and
at least one fastening part installed on an inner wall of the handle and disposed on a side of the chamber for pressing the stylus in a third direction perpendicular to a first direction for fastening the stylus inside the chamber after the stylus passes through the first opening in the first direction or passes through the second opening in a second direction opposite to the first direction to be received inside the chamber.

2. The stylus receiving mechanism of claim 1, further comprising at least one blocking part formed on the inner wall of the handle and disposed on an another side of the chamber, two blocking structures being formed on two ends of the blocking part respectively for blocking the stylus in the first direction or in the second direction when the stylus passes through the first opening in the first direction or passes through the second opening in the second direction to be received inside the chamber.

3. The stylus receiving mechanism of claim 2, wherein the blocking structure is an inclined structure.

4. The stylus receiving mechanism of claim 2, wherein two grooves are formed on the inner wall of the handle and disposed on two sides of the blocking part respectively for accommodating a keyswitch of the stylus when the stylus is received inside the chamber.

5. The stylus receiving mechanism of claim 1, wherein at least one groove is formed on the inner wall of the handle for accommodating a keyswitch of the stylus when the stylus is received inside the chamber.

6. The stylus receiving mechanism of claim 1, wherein the fastening part and the handle are connected with double injection molding technology.

7. The stylus receiving mechanism of claim 1, wherein the fastening part is made of elastic material.

8. The stylus receiving mechanism of claim 1, further comprising a holding structure connected to an outer side of the handle.

9. The stylus receiving mechanism of claim 1, wherein two inclined structures are formed on the two ends of the handle respectively, and the first opening and the second opening are formed on the two inclined structures correspondingly.

10. A portable computer comprising:
a host;
a stylus for use with the host; and
a stylus receiving mechanism connected to the host for receiving the stylus, the stylus receiving mechanism comprising:
a handle connected to the host, whereon a first opening and a second opening are formed on two ends, a chamber being formed inside the handle for receiving the stylus; and
at least one fastening part installed on an inner wall of the handle and disposed on a side of the chamber for pressing the stylus in a third direction perpendicular to a first direction for fastening the stylus inside the chamber after the stylus passes through the first opening in the first direction or passes through the second opening in a second direction opposite to the first direction to be received inside the chamber.

11. The portable computer of claim 10, further comprising at least one blocking part formed on the inner wall of the handle and disposed on an another side of the chamber, two blocking structures being formed on two ends of the blocking part respectively for blocking the stylus in the first direction or in the second direction when the stylus passes through the first opening in the first direction or passes through the second opening in the second direction to be received inside the chamber.

12. The portable computer of claim 11, wherein the blocking structure is an inclined structure.

13. The portable computer of claim 11, wherein two grooves are formed on the inner wall of the handle and disposed on two sides of the blocking part respectively for accommodating a keyswitch of the stylus when the stylus is received inside the chamber.

14. The portable computer of claim 10, wherein at least one groove is formed on the inner wall of the handle for accommodating a keyswitch of the stylus when the stylus is received inside the chamber.

15. The portable computer of claim 10, wherein the fastening part and the handle are connected with double injection molding technology.

16. The portable computer of claim 10, wherein the fastening part is made of elastic material.

17. The portable computer of claim 10, further comprising a holding structure connected to an outer side of the handle.

18. The portable computer of claim 10, wherein two inclined structure are formed on the two ends of the handle respectively, and the first opening and the second opening are formed on the two inclined structures correspondingly.

19. The portable computer of claim 10, further comprising a connecting part connected to an end of the stylus and the host.

20. The portable computer of claim 19, wherein the connecting part is a string.

* * * * *